US008683240B2

(12) United States Patent
Burns et al.

(10) Patent No.: US 8,683,240 B2
(45) Date of Patent: *Mar. 25, 2014

(54) INCREASING POWER EFFICIENCY OF TURBO MODE OPERATION IN A PROCESSOR (71) Applicant: Intel Corporation, Santa Clara, CA (US)

(72) Inventors: James S. Burns, Cupertino, CA (US); Baskaran Ganesan, Bangalore (IN); Russell J. Fenger, Beaverton, OR (US); Devadatta V. Bodas, Feneral Way, WA (US); Sundaravarathan R. Iyengar, Federal Way, WA (US); Feranak Nelson, Olympia, WA (US); John M. Powell, Jr., Austin, TX (US); Suresh Sugumar, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/780,038

(22) Filed: Feb. 28, 2013

(65) Prior Publication Data

US 2013/0179703 A1    Jul. 11, 2013

Related U.S. Application Data (63) Continuation of application No. 13/169,260, filed on Jun. 27, 2011.

(51) Int. Cl.
*G06F 1/00* (2006.01)
*G06F 9/46* (2006.01)

(52) U.S. Cl.
USPC ............................ 713/300; 718/100; 718/104

(58) Field of Classification Search
None
See application file for complete search history.

(56) References Cited

U.S. PATENT DOCUMENTS

| 5,163,153 | A   | 11/1992 | Cole et al. |
| 5,522,087 | A   | 5/1996  | Hsiang |
| 5,590,341 | A   | 12/1996 | Matter |
| 5,621,250 | A   | 4/1997  | Kim |
| 5,931,950 | A   | 8/1999  | Hsu |
| 6,748,546 | B1  | 6/2004  | Mirov et al. |
| 6,775,787 | B2* | 8/2004  | Greene ........................ 713/340 |

(Continued)

FOREIGN PATENT DOCUMENTS

EP    1 282 030 A1    5/2003

OTHER PUBLICATIONS

SPEC-Power and Performance, Design Overview V1.10, Standard Performance Information Corp., Oct. 21, 2008, 6 pages.

(Continued)

*Primary Examiner* — Ji H Bae
(74) *Attorney, Agent, or Firm* — Trop, Pruner & Hu, P.C.

(57) ABSTRACT

In one embodiment, a processor has multiple cores to execute threads. The processor further includes a power control logic to enable entry into a turbo mode based on a comparison between a threshold and value of a counter that stores a count of core power and performance combinations that identify turbo mode requests of at least one of the threads. In this way, turbo mode may be entered at a utilization level of the processor that provides for high power efficiency. Other embodiments are described and claimed.

19 Claims, 7 Drawing Sheets

(56) References Cited

U.S. PATENT DOCUMENTS

| | | | |
|---|---|---|---|
| 6,792,392 B1 | 9/2004 | Knight | |
| 6,823,516 B1 | 11/2004 | Cooper | |
| 6,829,713 B2 | 12/2004 | Cooper et al. | |
| 6,996,728 B2 | 2/2006 | Singh | |
| 7,010,708 B2 | 3/2006 | Ma | |
| 7,043,649 B2 | 5/2006 | Terrell | |
| 7,093,147 B2 | 8/2006 | Farkas et al. | |
| 7,111,179 B1 | 9/2006 | Girson et al. | |
| 7,194,643 B2 | 3/2007 | Gonzalez et al. | |
| 7,272,730 B1 | 9/2007 | Acquaviva et al. | |
| 7,412,615 B2 | 8/2008 | Yokota et al. | |
| 7,434,073 B2 | 10/2008 | Magklis | |
| 7,437,270 B2 | 10/2008 | Song et al. | |
| 7,454,632 B2 | 11/2008 | Kardach et al. | |
| 7,529,956 B2 | 5/2009 | Stufflebeam | |
| 7,539,885 B2 | 5/2009 | Ma | |
| 7,730,340 B2 | 6/2010 | Hu et al. | |
| 7,818,596 B2* | 10/2010 | Fenger et al. | 713/322 |
| 7,903,116 B1 | 3/2011 | Klock et al. | |
| 7,966,506 B2 | 6/2011 | Bodas | |
| 8,127,153 B2* | 2/2012 | Kapil | 713/300 |
| 8,291,249 B2* | 10/2012 | Branover et al. | 713/323 |
| 2001/0044909 A1 | 11/2001 | Oh et al. | |
| 2002/0194509 A1 | 12/2002 | Plante et al. | |
| 2003/0061383 A1 | 3/2003 | Zilka | |
| 2004/0064752 A1 | 4/2004 | Kazachinsky et al. | |
| 2004/0098560 A1 | 5/2004 | Storvik et al. | |
| 2004/0139356 A1 | 7/2004 | Ma | |
| 2004/0268166 A1 | 12/2004 | Farkas et al. | |
| 2005/0022038 A1 | 1/2005 | Kaushik et al. | |
| 2005/0033881 A1 | 2/2005 | Yao | |
| 2005/0132238 A1 | 6/2005 | Nanja | |
| 2006/0050670 A1 | 3/2006 | Hillyard et al. | |
| 2006/0053326 A1 | 3/2006 | Naveh | |
| 2006/0059286 A1 | 3/2006 | Bertone et al. | |
| 2006/0069936 A1 | 3/2006 | Lint et al. | |
| 2006/0117202 A1 | 6/2006 | Magklis et al. | |
| 2006/0184287 A1 | 8/2006 | Belady et al. | |
| 2007/0005995 A1 | 1/2007 | Kardach et al. | |
| 2007/0016817 A1 | 1/2007 | Albonesi et al. | |
| 2007/0033425 A1 | 2/2007 | Clark | |
| 2007/0079294 A1 | 4/2007 | Knight | |
| 2007/0094444 A1 | 4/2007 | Sutardja | |
| 2007/0106827 A1 | 5/2007 | Boatright et al. | |
| 2007/0156992 A1 | 7/2007 | Jahagirdar | |
| 2007/0214342 A1 | 9/2007 | Newburn | |
| 2007/0239398 A1 | 10/2007 | Song et al. | |
| 2007/0245163 A1 | 10/2007 | Lu et al. | |
| 2008/0028240 A1 | 1/2008 | Arai et al. | |
| 2008/0104425 A1 | 5/2008 | Gunther | |
| 2008/0162972 A1 | 7/2008 | Liu | |
| 2008/0250260 A1 | 10/2008 | Tomita | |
| 2009/0006871 A1 | 1/2009 | Liu et al. | |
| 2009/0150695 A1 | 6/2009 | Song et al. | |
| 2009/0150696 A1 | 6/2009 | Song et al. | |
| 2009/0158061 A1 | 6/2009 | Schmitz et al. | |
| 2009/0158067 A1 | 6/2009 | Bodas et al. | |
| 2009/0172375 A1 | 7/2009 | Rotem et al. | |
| 2009/0172428 A1 | 7/2009 | Lee | |
| 2009/0235105 A1 | 9/2009 | Branover et al. | |
| 2010/0115309 A1 | 5/2010 | Carvalho et al. | |
| 2010/0146513 A1 | 6/2010 | Song | |
| 2010/0191997 A1 | 7/2010 | Dodeja et al. | |
| 2011/0087900 A1 | 4/2011 | Lakhanpal et al. | |
| 2011/0106282 A1 | 5/2011 | Craig et al. | |
| 2011/0154090 A1 | 6/2011 | Dixon et al. | |
| 2012/0079290 A1 | 3/2012 | Kumar | |
| 2012/0246506 A1 | 9/2012 | Knight | |
| 2013/0061064 A1 | 3/2013 | Ananthakrishnan et al. | |
| 2013/0080803 A1 | 3/2013 | Ananthakrishnan et al. | |
| 2013/0080804 A1 | 3/2013 | Ananthakrishnan et al. | |
| 2013/0111120 A1 | 5/2013 | Ananthakrishnan et al. | |
| 2013/0111121 A1 | 5/2013 | Ananthakrishnan et al. | |
| 2013/0111226 A1 | 5/2013 | Ananthakrishnan et al. | |
| 2013/0111236 A1 | 5/2013 | Ananthakrishnan et al. | |

OTHER PUBLICATIONS

Intel Technology Journal, "Power and Thermal Management in the Intel Core Duo Processor," May 15, 2006, pp. 109-122.

Anoop Iyer, et al., "Power and Performance Evaluation of Globally Asynchronous Locally Synchronous Processors," 2002, pp. 1-11.

Greg Semeraro, et al., "Hiding Synchronization Delays in a GALS Processor Microarchitecture," 2004, pp. 1-13.

Joan-Manuel Parcerisa, et al., "Efficient Interconnects for Clustered Microarchitectures," 2002, pp. 1-10.

Grigorios Magklis, at al., "Profile-Based Dynamic Voltage and Frequency Scaling for a Multiple Clock Domain Microprocessor," 2003, pp. 1-12.

Greg Semeraro, et al., "Dynamic Frequency and Voltage Control for a Multiple Clock Domain Architecture," 2002, pp. 1-12.

Greg Semeraro, "Energy-Efficient Processor Design Using Multiple Clock Domains with Dynamic Voltage and Frequency Scaling," 2002, pp. 29-40.

Diana Marculescu, "Application Adaptive Energy Efficient Clustered Architectures," 2004, pp. 344-349.

L. Benini, et al., "System-Level Dynamic Power Management," 1999, pp. 23-31.

Ravindra Jejurikar, et al., "Leakage Aware Dynamic Voltage Scaling for Real-Time Embedded Systems," 2004, pp. 275-280.

Ravindra Jejurikar, at al., "Dynamic Slack Reclamation With Procrastination Scheduling in Real-Time Embedded Systems," 2005, pp. 13-17.

R. Todling, et al., "Some Strategies for Kalman Filtering and Smoothing," 1996, pp. 1-21.

R.E. Kalman, "A New Approach to Linear Filtering and Prediction Problems," 1960, pp. 1-12.

U.S. Appl. No. 12/889,121, entitled, "Providing Per Core Voltage and Frequency Control," filed Sep. 23, 2010, by Pankaj Kumar.

U.S. Appl. No. 13/070,700, entitled, "Obtaining Power Profile Information With Low Overhead," filed Mar. 24, 2011, by Robert Knight.

Intel Developer Forum, IDF2010, Opher Kahn, et al., "Intel Next Generation Microarchitecture Codename Sandy Bridge: New Processor Innovations," Sep. 13, 2010, 58 pages.

International Application No. PCT/US2012/028865, filed Mar. 13, 2012, entitled "Providing Efficient Turbo Operation of a Processor," by Intel Corporation.

International Application No. PCT/US2012/028902, filed Mar. 13, 2012, entitled "Dynamically Controlling Interconnect Frequency in a Processor," by Intel Corporation.

International Application No. PCT/US2012/028876, filed Mar. 13, 2012, entitled "Dynamically Computing an Electrical Design Point (EDP) for a Multicore Processor," by Intel Corporation.

U.S. Appl. No. 13/600,568, filed Aug. 31, 2012, entitled, "Configuring Power Management Functionality in a Processor," by Malini K. Bhandaru, et al.

International Searching Authority, "Notificatoiion of Transmittal of the International Search Report and the Written Opinion of the International Searching Authority," mailed Dec. 26, 2012, in International application No. PCT/US2012/043407.

* cited by examiner

INCREASING POWER EFFICIENCY OF TURBO MODE OPERATION IN A PROCESSOR

This application is a continuation of U.S. patent application Ser. No. 13/169,260, filed Jun. 27, 2011, the content of which is hereby incorporated by reference.

BACKGROUND

Many modern operating systems (OS's) use the Advanced Configuration and Power Interface (ACPI) standard, e.g., Rev. 3.0b, published Oct. 10, 2006, for optimizing system power. An ACPI implementation allows a processor core to be in different power-consumption states, generally referred to as so-called C1 to Cn states. When a core is active, it runs at a so-called C0 state, and when the core is idle it may be placed in a core low power state, a so-called core non-zero C-state (e.g., C1-C6 states).

In addition to power-saving states, performance states or so-called P-states are also provided in ACPI. These performance states may allow control of performance-power levels while a core is in an active (C0) state. In general, multiple P-states may be available, namely from P0-Pn, where P0 corresponds to a maximum frequency for the core, while each P-state, e.g., P1-Pn, operates the core at lower performance levels.

Many processors provide hardware support for improved performance. Oftentimes, such support includes a so-called turbo mode in which when additional headroom (e.g., current consumption, power consumption and temperature) is available, the processor can operate at a higher frequency to maximize performance.

Operating systems such as a Microsoft WINDOWS™ OS provide for three modes of operation: power saving, balanced, and high performance. Turbo mode is disabled in the power saving mode, and is always enabled in the high performance mode. However, the balanced mode is expected to make intelligent decisions about when to enter turbo mode for performance and when to emphasize power savings. In this balanced mode, at low utilizations, turbo mode is not enabled as power consumption may be excessively high, particularly for the amount of utilization occurring. However, at higher utilizations (e.g., greater than approximately 80%), turbo mode may be enabled. This is so, as without providing for this higher frequency, there is a risk that expected performance may not be obtained.

The SPECpower_ssj2008 benchmark is an industry standard metric to determine the power efficiency of a system. Performance and power measurements are taken at various load levels from 0 to 100% utilization. An OS vendor may choose to disable turbo mode entirely in a default balanced mode if it is active at lower utilization points of the SPECpower_ssj2008 benchmark, since current OS requirements dictate that in the balanced mode that turbo mode not be entered until a utilization rate of 80% is reached. But with an ever-increasing number of threads executing on a processor, turbo mode may be entered at utilization rates as low as 50%. Thus the OS vendor may disable turbo mode in the balanced mode of operation and as a result, a user does not obtain the possible performance benefits of turbo mode.

Intelligent turbo is a technique that attempts to deal with this problem by delaying turbo mode entry for a programmed delay. However, this eliminates the performance upside for single-threaded and throughput modes. And, the delay window can be relatively long, which prevents a requesting application from taking advantage of the increased performance of turbo mode. The frequency loss of disabling turbo for single-thread applications can be as much as a gigahertz (GHz) or more.

DETAILED DESCRIPTION

Embodiments may monitor various information to determine when to enable turbo mode performance. As used herein, an active "turbo mode" means an operation mode in which at least one processor domain (e.g., 1 or more cores) is operating at a higher than guaranteed operating frequency. For example, assume a processor has a stamped thermal design power (TDP) frequency of 2.0 gigahertz (GHz). This frequency may correspond to a P1 performance state, namely the maximum guaranteed operating frequency. Instead, in the P0 state, the operating frequency may be higher (depending on other factors such as number of active cores, workload types, thermal budget and so forth). Accordingly, the P0 state is an opportunistic state in which operating frequency can exceed the TDP maximum operating frequency. Assume that a given processor has multiple bins of upside, e.g., 10 bins. As a result, the processor can operate in the P0 mode at somewhere from 2 GHz all the way up to 3 GHz, depending on certain factors. These factors include how many threads are running, the workloads of those threads, and so forth.

More specifically, in one embodiment a turbo mode determination, which may be made in a power control unit of a processor, may be based on both core power state information (referred to herein as C-state) and processor performance state information (referred to herein as P-state) to determine when the processor can best take advantage of turbo performance. In general, a thread requests turbo mode by requesting the P0 state, and the C0 state either by the thread itself or by another thread.

P0 residency increases at lower utilization points as a processor supports greater numbers of threads. This is caused by the OS, which measures utilization at the thread level and sets all threads to the highest requested performance (lowest numbered) P-state. The more threads, the higher the probability of entering the P0 turbo mode. That is, an OS running on a thread can generate requests for different P-states for various threads. The power control unit may then determine the appropriate P-state for a given domain based on these multiple requests. In general, the power control unit may analyze the P-states and select a P-state for the domain based on the highest requested state. For example, so long as a single thread requests the P0 state, all threads of the domain may execute in the P0 state.

In many OSs such as a Microsoft WINDOWS™ OS, although it receives requests for lower performance states from one or more threads, it may not pass these requests on to the power control unit if it is aware of at least one other thread that is requesting a higher (e.g., P0) state. As a result, the power control unit may not have accurate information as to actual performance state requested by executing threads. Due to this filtering of certain performance requests by the OS, it may appear to the power control unit that there are more P0 requests (at least on a percentage basis) than actually exist. Thus a processor may be in a higher performance state for lower utilization levels than it otherwise could be, which can lead to a violation of OS requirements, as described above. Embodiments may seek to reduce entry into a turbo mode even in light of this filtering of non-P0 requests done by the OS.

Thread C0 residency, in contrast to P0 residency, is fairly linear with utilization levels. In general for a SPECpower_ssj2008 workload, at 100% utilization the processor is in the C0 state nearly 100% of the time. As the utilization goes down, the C0 residency goes down as well, in a substantially linear manner.

Figure 1:
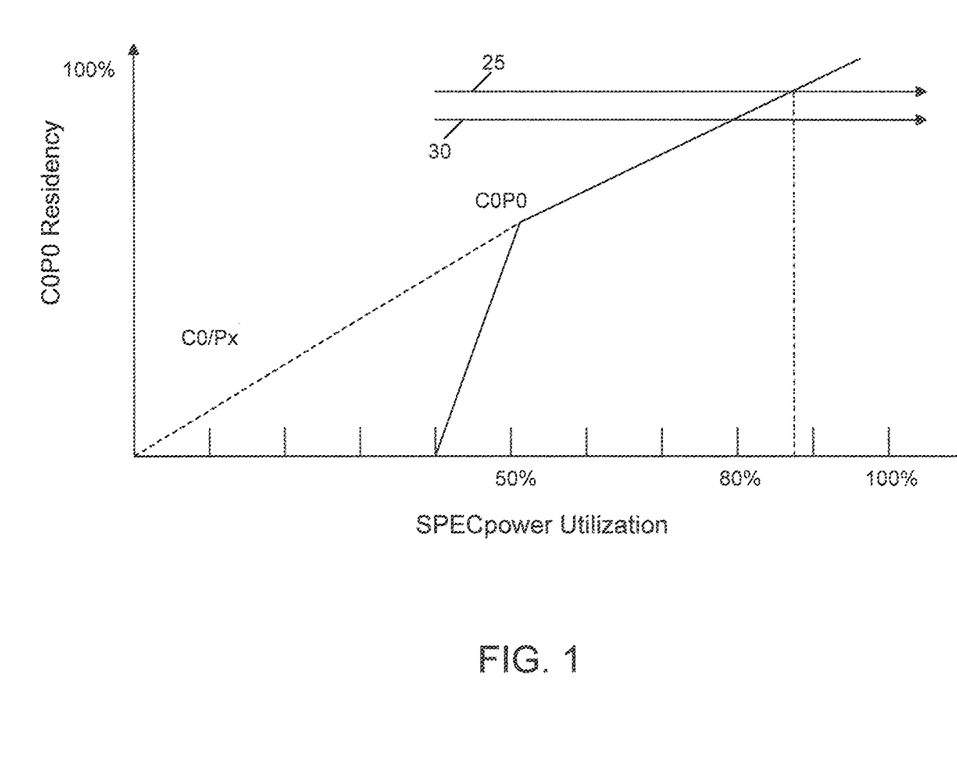
FIG. 1 is a graphical illustration of an intelligent turbo mode control algorithm in accordance with an embodiment of the present invention.

Embodiments thus may leverage information regarding both C0 and P0 residency to enhance turbo mode power efficiency. More specifically, as shown in FIG. 1, which is a graphical illustration of an intelligent turbo mode control algorithm in accordance with an embodiment of the present invention, the higher the application workload, the more time spent in the C0 state. Higher levels of processor utilization also trigger the OS to set the P-state to a higher level (lower numbered) state. Embodiments may thus take advantage of the linear nature between C0P0 residency and utilization such that turbo mode is enabled when the C0P0 residency crosses a predetermined utilization percentage. As shown in FIG. 1, horizontal lines 25 and 30 correspond to different weightings of non-turbo mode versus turbo mode. As seen, at a higher weighting for the non-turbo mode, the threshold utilization level at which turbo mode is enabled is higher. As specifically seen, at an 8× weighting shown in line 25, the threshold utilization level is approximately 89%, while at a 4× weighting shown at line 30, the threshold utilization level is approximately 79%.

In an embodiment described herein, C0P0 residency can be monitored through a set of continuous counters maintained on a per-thread basis. These counters may be referred to herein as turbo mode counters. An embodiment may cause a given turbo mode counter to increment when the combined state requested by the thread is C0P0, and decrement in any other state. The relative increment/decrement can be weighted to adjust a utilization point (e.g., with regard to a benchmark workload such as SPECpower_ssj2008) to the desired value. For example, if the non-C0P0/C0P0 weight is set to 8×, then the utilization point is 8/(8+1)=89%. As a result, it takes over 8 times as much C0P0 time as non-C0P0 time before the turbo mode counter increments. Or equivalently, the counter may be decremented by a greater weight for a non-C0P0 state than it is incremented for the C0P0 state. In this way, improved control over a utilization point at which turbo mode is enabled can be realized.

Also by providing the continuous counters, turbo mode performance may be improved during short bursts of deeper C-states (e.g., deeper sleep states). The continuous count also weights deeper C-state requests because a processor generally stays in that C-state longer. In one embodiment, each counter can be updated (e.g., incremented/decremented) during each power control code loop executed by a power control unit. In this embodiment, counts may be maintained on a per-thread basis, and then combined together into a domain (e.g., a voltage domain) level decision. A processor may include multiple voltage and frequency planes or domains. A voltage domain could be all cores of a processor, a subset of cores, or a single core depending on the processor design, and each domain can be individually controlled to be at a given voltage and frequency combination.

Embodiments may operate in both throughput (all cores active) and single-thread modes. As long as a single thread requests turbo mode for a delay threshold (described below), then turbo mode is enabled. Performing the algorithm on a per-thread basis also allows the delay threshold to be reduced significantly, enabling a processor to respond faster to turbo requests.

Figure 2:
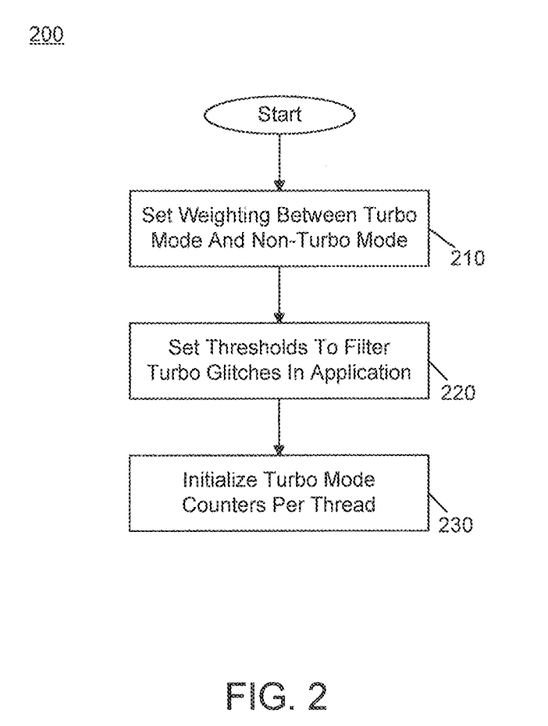
FIG. 2 is a flow diagram of a method of configuring a processor for turbo mode operation in accordance with an embodiment of the present invention.

Referring now to FIG. 2, shown is a flow diagram of a method of configuring a processor for turbo mode operation in accordance with an embodiment of the present invention. As shown in FIG. 2, method 200 may be used to configure, e.g., a power control unit of a processor to analyze various incoming information from multiple threads executing on the processor to determine an appropriate point at which to enter a turbo mode of operation. Note that in various embodiments, this point at which to enter turbo mode may occur at a relatively high utilization level of the processor, e.g., at an 80% or greater utilization level, even when a large number of threads (e.g., 12 or more) are executing on the processor.

As seen in FIG. 2, method 200 may begin by setting a weighting between turbo mode and non-turbo mode (block 210). That is, as discussed above embodiments may weight more heavily non-turbo mode requests from threads to thus cause the processor to enter into a turbo mode only when a correspondingly large number of turbo mode requests have been received from the threads. In one embodiment, this weighting may be set such that non-turbo mode requests are weighted at 8 times the value given to a turbo mode request, although the scope of the present invention is not limited in this regard. In this way, turbo mode may only be entered when a processor reaches a relatively high utilization rate, e.g., 89% in this example. As such this weighting can set a threshold utilization level below which turbo mode is not to be enabled.

Various manners of setting this weighting may occur in different embodiments. In some embodiments, this weighting may be hard coded via firmware present in a power control unit of a processor uncore. In other embodiments, the weighting may be set by various entities, including by providing a configuration register that may be set by system software, such as a basic input/output system (BIOS) on system startup or under operating system (OS) control. In yet other embodiments, this weighting can be exposed to a user via providing a user-accessible configuration register to enable a given weighting. Thus in various embodiments the selection of the threshold utilization level for entering turbo mode can be static (e.g., fixed on manufacture), controlled by system software such as BIOS or OS, or even dynamically configurable by a user via a user-accessible configuration register.

In addition to setting weightings, multiple thresholds may also be set (block 220). In various embodiments, these multiple thresholds may provide for a level of hysteresis such that a higher threshold is to be reached before entering into turbo mode, while so long as at least a smaller threshold is met while in the turbo mode, the turbo mode may remain active. Thus these thresholds can be used to filter turbo mode glitches that may occur in an application. Although the scope of the present invention is not limited in this regard, in one embodiment these thresholds may be hard coded into a processor, and may correspond to various counter levels. Finally after setting these weightings and thresholds, a plurality of turbo mode counters may be initialized (block 230). More specifically, a power control unit may include a residency counter for tracking C0P0 requests, e.g., on a per-thread basis. Although shown with this particular implementation in the embodiment of FIG. 2, understand the scope of the present invention is not limited in this regard.

Figure 3:
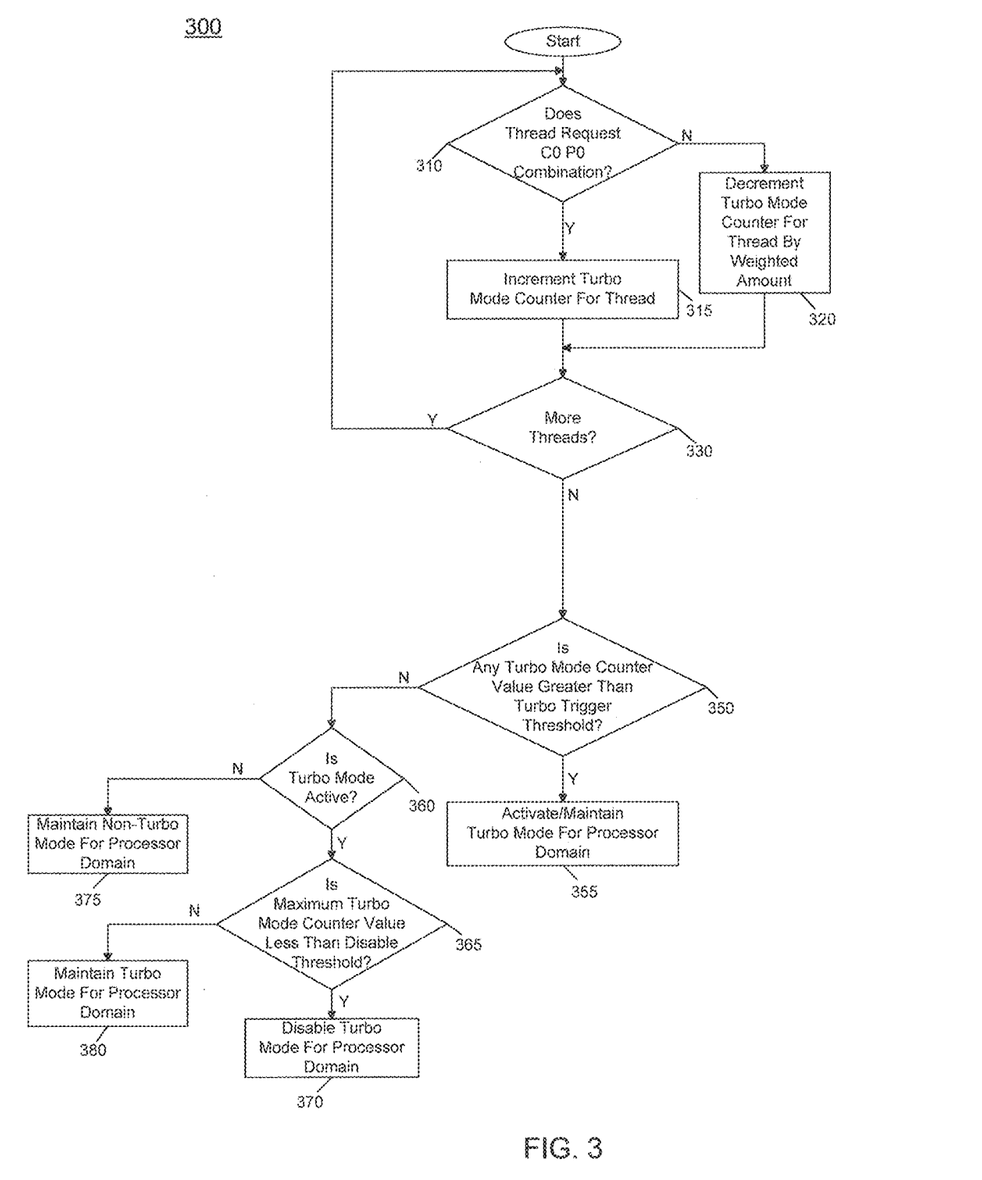
FIG. 3 is a flow diagram of a turbo mode control method in accordance with an embodiment of the present invention.

Referring now to FIG. 3, shown is a flow diagram of a turbo control method in accordance with an embodiment of the present invention. As shown in FIG. 3, method 300 may be implemented in a power control unit of a processor, e.g., as present in a processor uncore. In general, method 300 may be used to intelligently enter a turbo mode only when a processor utilization is above a predetermined level. In addition, the method may provide for filtering of turbo mode requests as well as providing a measure of hysteresis such that once in a turbo mode, the processor does not immediately fall out of the turbo mode and then re-enter the turbo mode, which could cause greater power consumption by the operations of entering into and exiting turbo mode.

In general, method 300 may be executed during each power control loop performed by the power control unit. Also note that the method may be performed independently for multiple domains in a multi-domain processor. Thus in a processor having multiple voltage domains, each voltage domain, e.g., as powered by a given voltage regulator, may operate at a uniform mode and thus voltage and frequency.

As seen, method 300 may begin by determining whether a thread requests a C0P0 combination (diamond 310). As used herein, this C0P0 combination may correspond to a turbo mode request in that the thread is requesting a highest performance state (P0) as well as a highest core power state (C0). In an embodiment, this determination may be based on analysis of various control information present in the power control unit. For example, a set of residency registers may be provided, with a first residency register to indicate C0 requests and another residency register to indicate P0 requests. In such an embodiment, these residency registers may have a plurality of bits, with each bit associated with a given thread executing on the processor. Thus when a thread requests a C0P0 combination, the corresponding bits of the P0 residency register and the C0 residency register may be set. Although in this implementation these registers provide for per thread information, understand that other implementations are possible. For example, a C0 and P0 residency register may be provided for each domain or even on a core basis.

If it is determined at diamond 310 that a thread requests the C0P0 state, control passes to block 315 where a turbo mode counter may be incremented for that thread. If instead at diamond 310 it is determined that the thread has not requested this C0P0 state, control rather passes to block 320. There, the turbo mode counter for the thread may be decremented by a weighted amount. That is, as discussed above, to ensure that turbo mode is only entered at high utilization rates, such non-turbo mode requests may be more highly weighted than turbo mode requests. As in the example above, this decrement may be an 8 times decrement as compared to an increment. Thus on a non-turbo mode request, the thread's turbo mode counter may be decremented by 8 while instead on a turbo mode request, the same counter may only be incremented by one (in this example) such that different weightings apply to C0P0 and non-C0P0 requests. Changing the weight adjusts the target utilization break point. The larger the decrement value, the higher the utilization before entering turbo. Control passes next to diamond 330 where it may be determined whether there are more threads present to be analyzed. If so, control passes back to diamond 310. Otherwise, for this power control loop, all threads and turbo mode counters have been appropriately updated and accordingly, control passes to diamond 350.

Still referring to FIG. 3, at diamond 350 it can be determined whether any of the threads' turbo mode counter values is greater than a turbo trigger threshold. This turbo trigger threshold may correspond to a counter value above which a turbo mode should be entered. Accordingly, the power control unit may analyze all of the threads' turbo mode counters to determine if at least one of them has a value above this threshold. In one embodiment, the power control unit that implements method 300 may execute an OR function to determine if any of the turbo mode counters is above the trigger threshold. If so, control passes to block 355 where the turbo mode may be activated if the processor domain was previously not in the turbo mode. And if the processor domain was already in the turbo mode, the turbo mode may be maintained.

Although not shown for ease of illustration in FIG. 3, in some embodiments a delay mechanism can be implemented to delay entry into the turbo mode for a predetermined amount of time after the turbo mode trigger threshold is exceeded. This delay period may occur after an affirmative determination at diamond 350. When this timer times out, it can be determined again whether the given turbo mode counter is still greater than the trigger threshold. If so, turbo mode is entered at block 355 and otherwise it is not. Although the scope of the present invention is not limited in this regard, this delay timer may be on the order of between approximately 0.1 and 10 seconds.

If at diamond 350 it is determined that there are no threads having a turbo mode counter value above this turbo trigger threshold, control instead passes to diamond 360 where it can be determined whether the turbo mode is presently active. If not, control passes to block 375 where the non-turbo mode may be maintained for the processor domain. If instead turbo mode is active, control passes to diamond 365 where it can be determined whether the maximum turbo mode counter value for the threads of the processor domain is less than a turbo disable threshold. This turbo disable threshold level may be at a lower level than the turbo mode trigger threshold to provide a measure of hysteresis such that when in a turbo mode, a short term drop below the trigger mode threshold does not cause turbo mode exit. In this way, a bursty pattern of a program can be accommodated to thus maintain turbo mode even when small bursts below the turbo mode trigger threshold level occur. Thus so long as at least one turbo mode counter value for the threads of the processor domain is above this disable threshold, the turbo mode may be maintained for the processor domain (block 380). Otherwise, if all of the turbo mode counter values for the threads of the processor domain are less than this disable threshold, control passes to block 370 where the turbo mode may be disabled for the given processor domain. Although shown with this particular implementation in the embodiment of FIG. 3, understand the scope of the present invention is not limited in this regard.

As seen in Table 1, single-thread turbo mode control results in accordance with an embodiment of the present invention shows the SPECpower utilization point with varying non-C0P0/C0P0 weights. The higher the weight for these non-turbo mode requests, the higher the utilization point target. The results clearly show that turbo residency increases with the weight. More specifically, the top row of Table 1 sets forth utilization rates for a benchmark workload from 60% to 100%. In turn, the first column identifies the various weightings between non-turbo mode and turbo mode, the second column identifies a resulting target or threshold utilization rate. And the remaining columns identify a percentage of time that the processor operates in a turbo mode.

TABLE 1

| Non-C0P0/C0P0 weight | Target % | 60% | 70% | 80% | 90% | 100% |
|---|---|---|---|---|---|---|
| 2x | 67% | 0 | 0.04 | 0.76 | 0.97 | 0.99 |
| 4x | 80% | 0 | 0 | 0.09 | 0.60 | 0.99 |
| 8x | 89% | 0 | 0 | 0.02 | 0.25 | 0.99 |
| 16x | 94% | 0 | 0 | 0.01 | 0.17 | 0.98 |

As seen in Table 2, socket-level turbo mode control results in accordance with an embodiment of the present invention have a lower SPECpower_ssj2008 utilization point than the single-thread results, since the probability of a P0 turbo request increases with the number of active threads. There are two parameters that can increase the turbo mode entry utilization point. First, the higher weight increases the target utilization point. Second, the delay threshold filters out short glitches of turbo residency, tightening control of the utilization point.

TABLE 2

| Non-C0P0/C0P0 weight | Target | 60% | 70% | 80% | 90% | 100% |
|---|---|---|---|---|---|---|
| 2x | 67% | 0 | 0.69 | 1.00 | 1.00 | 1.00 |
| 4x | 80% | 0 | 0 | 0.94 | 1.00 | 1.00 |
| 8x | 89% | 0 | 0 | 0.38 | 1.00 | 1.00 |
| 16x | 94% | 0 | 0 | 0.17 | 1.00 | 1.00 |

Figure 4:
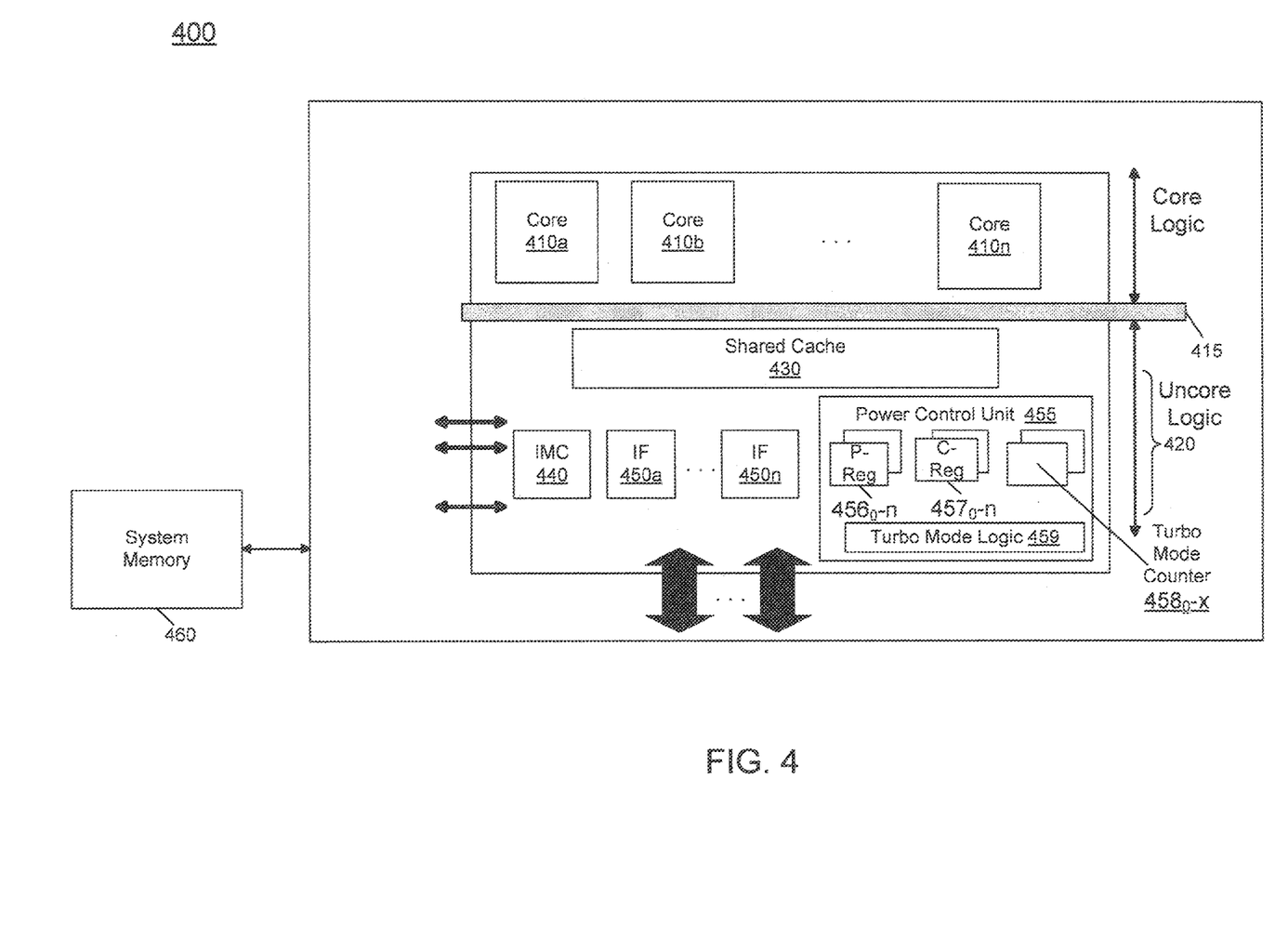
FIG. 4 is a block diagram of a processor in accordance with an embodiment of the present invention.

Referring now to FIG. 4, shown is a block diagram of a processor in accordance with an embodiment of the present invention. As shown in FIG. 4, processor 400 may be a multicore processor including a plurality of cores $410_a$-$410_n$. In one embodiment, each such core may be configured to operate at multiple voltages and/or frequencies, and to enter turbo mode as instructed. The various cores may be coupled via an interconnect 415 to a system agent or uncore 420 that includes various components. As seen, the uncore 420 may include a shared cache 430 which may be a last level cache. In addition, the uncore may include an integrated memory controller 440, various interfaces 450 and a power control unit 455.

In various embodiments, power control unit 455 may be in communication with OS power management code. For example, based on requests received from the OS, power control unit 455 may update appropriate status information such as P-states and C-states, e.g., present in P-state and C-state residency registers $456_0$-$456_n$ and $457_0$-$457_n$, respectively, and maintain turbo mode counters $458_0$-$458_x$ for various executing threads.

As further seen, power control unit may include turbo mode logic 459. In various embodiments, logic 459 may implement the turbo mode analysis performed, e.g., in FIG. 3 above, as well as handling some of the configuration operations for configuring the weighting between C0P0 and non-C0P0 states, various turbo mode thresholds and so forth.

Accordingly, turbo mode logic 459 may receive incoming requests for turbo mode and update the appropriate counters and registers. Then during execution of a power control loop within power control unit 455, turbo mode logic 459 may analyze the turbo mode counters for the given threads to determine whether turbo mode is to be entered, exited or maintained, depending on the values of the counters and the corresponding thresholds. Responsive to such analysis, power control unit 455 may generate a plurality of control signals to cause the cores of one or more domains to operate in a turbo or non-turbo mode. In this way, turbo mode logic 459 may only enable entry and maintenance in a turbo mode when a utilization rate for the processor is at least at a relatively high threshold level, e.g., 80% or greater. In addition, in some embodiments turbo mode logic 459 may further delay entry into a turbo mode after a given turbo mode counter exceeds a trigger threshold, to prevent a short burst of thread execution from causing turbo mode to be entered for only a short period of time. Although shown with this particular level of detail in the embodiment of FIG. 4, understand the scope of the present invention is not limited in this regard.

With further reference to FIG. 4, processor 400 may communicate with a system memory 460, e.g., via a memory bus. In addition, by interfaces 450, connection can be made to various off-chip components such as peripheral devices, mass storage and so forth. While shown with this particular implementation in the embodiment of FIG. 4, the scope of the present invention is not limited in this regard.

Figure 5:
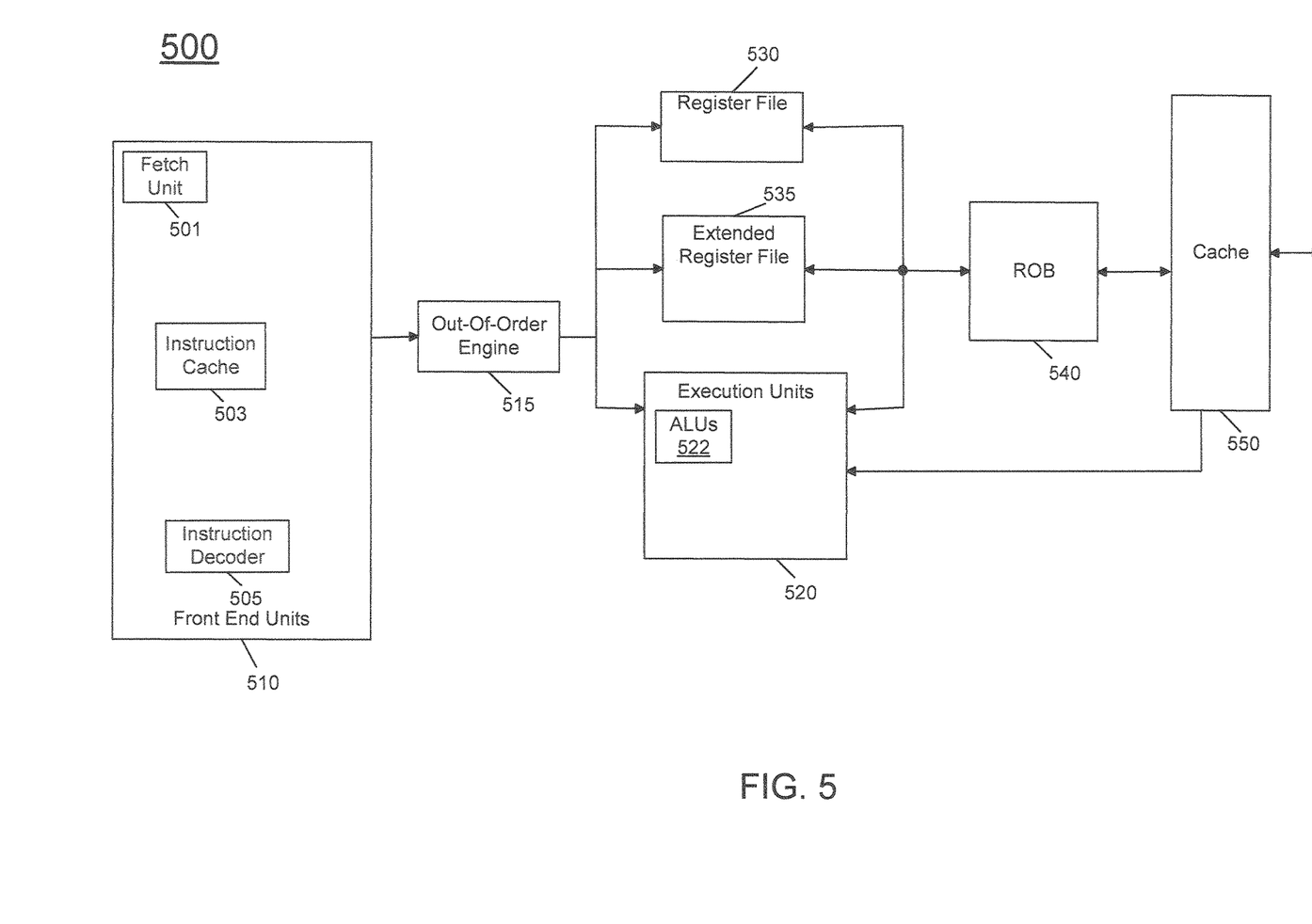
FIG. 5 is a block diagram of a processor core in accordance with one embodiment of the present invention.

Referring now to FIG. 5, shown is a block diagram of a processor core in accordance with one embodiment of the present invention. As shown in FIG. 5, processor core 500 may be a multi-stage pipelined out-of-order processor. As shown in FIG. 5, core 500 may operate at different voltages and frequencies (both in and out of turbo mode).

As seen in FIG. 5, core 500 includes front end units 510, which may be used to fetch instructions to be executed and prepare them for use later in the processor. For example, front end units 510 may include a fetch unit 501, an instruction cache 503, and an instruction decoder 505. In some implementations, front end units 510 may further include a trace cache, along with microcode storage as well as a micro-operation storage. Fetch unit 501 may fetch macro-instructions, e.g., from memory or instruction cache 503, and feed them to instruction decoder 505 to decode them into primitives, i.e., micro-operations for execution by the processor.

Coupled between front end units 510 and execution units 520 is an out-of-order (OOO) engine 515 that may be used to receive the micro-instructions and prepare them for execution. More specifically OOO engine 515 may include various buffers to re-order micro-instruction flow and allocate various resources needed for execution, as well as to provide renaming of logical registers onto storage locations within various register files such as register file 530 and extended register file 535. Register file 530 may include separate register files for integer and floating point operations. Extended register file 535 may provide storage for vector-sized units, e.g., 256 or 512 bits per register.

Various resources may be present in execution units 520, including, for example, various integer, floating point, and single instruction multiple data (SIMD) logic units, among other specialized hardware. For example, such execution units may include one or more arithmetic logic units (ALUs) 522, among other such execution units.

Results from the execution units may be provided to retirement logic, namely a reorder buffer (ROB) 540. More specifically, ROB 540 may include various arrays and logic to receive information associated with instructions that are executed. This information is then examined by ROB 540 to determine whether the instructions can be validly retired and result data committed to the architectural state of the processor, or whether one or more exceptions occurred that prevent a proper retirement of the instructions. Of course, ROB 540 may handle other operations associated with retirement.

As shown in FIG. 5, ROB 540 is coupled to a cache 550 which, in one embodiment may be a low level cache (e.g., an L1 cache) although the scope of the present invention is not limited in this regard. Also, execution units 520 can be directly coupled to cache 550. From cache 550, data communication may occur with higher level caches, system memory and so forth. While shown with this high level in the embodiment of FIG. 5, understand the scope of the present invention is not limited in this regard. For example, while the implementation of FIG. 5 is with regard to an out-of-order machine such as of a so-called x86 instruction set architecture (ISA), the scope of the present invention is not limited in this regard. That is, other embodiments may be implemented in an in-order processor, a reduced instruction set computing (RISC) processor such as an ARM-based processor, or a processor of another type of ISA that can emulate instructions and operations of a different ISA via an emulation engine and associated logic circuitry.

Figure 6:
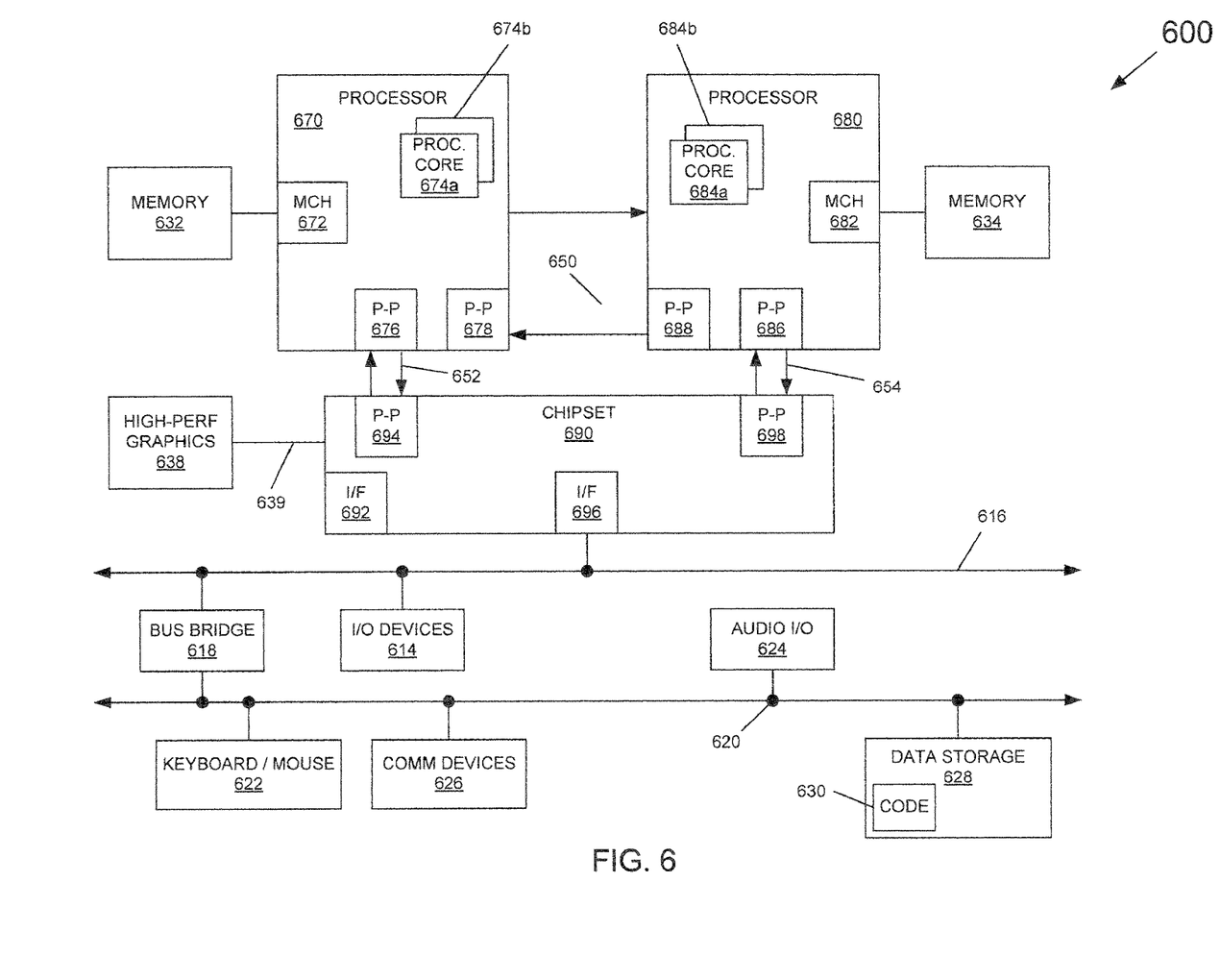
FIG. 6 is a block diagram of a system in accordance with an embodiment of the present invention.

Embodiments may be implemented in many different system types. Referring now to FIG. 6, shown is a block diagram of a system in accordance with an embodiment of the present invention. As shown in FIG. 6, multiprocessor system 600 is a point-to-point interconnect system, and includes a first processor 670 and a second processor 680 coupled via a point-to-point interconnect 650. As shown in FIG. 6, each of processors 670 and 680 may be multicore processors, including first and second processor cores (i.e., processor cores 674a and 674b and processor cores 684a and 684b), although potentially many more cores may be present in the processors. Each of one or more domains of the processors can be controlled to only enter turbo mode at a relatively high utilization level of the processor, as described herein.

Still referring to FIG. 6, first processor 670 further includes a memory controller hub (MCH) 672 and point-to-point (P-P) interfaces 676 and 678. Similarly, second processor 680 includes a MCH 682 and P-P interfaces 686 and 688. As shown in FIG. 6, MCH's 672 and 682 couple the processors to respective memories, namely a memory 632 and a memory 634, which may be portions of system memory (e.g., DRAM) locally attached to the respective processors. First processor 670 and second processor 680 may be coupled to a chipset 690 via P-P interconnects 652 and 654, respectively. As shown in FIG. 6, chipset 690 includes P-P interfaces 694 and 698.

Furthermore, chipset 690 includes an interface 692 to couple chipset 690 with a high performance graphics engine 638, by a P-P interconnect 639. In turn, chipset 690 may be coupled to a first bus 616 via an interface 696. As shown in FIG. 6, various input/output (I/O) devices 614 may be coupled to first bus 616, along with a bus bridge 618 which couples first bus 616 to a second bus 620. Various devices may be coupled to second bus 620 including, for example, a keyboard/mouse 622, communication devices 626 and a data storage unit 628 such as a disk drive or other mass storage device which may include code 630, in one embodiment. Further, an audio I/O 624 may be coupled to second bus 620. Embodiments can be incorporated into other types of systems including mobile devices such as a smart cellular telephone, tablet computer, netbook, or so forth.

Figure 7:
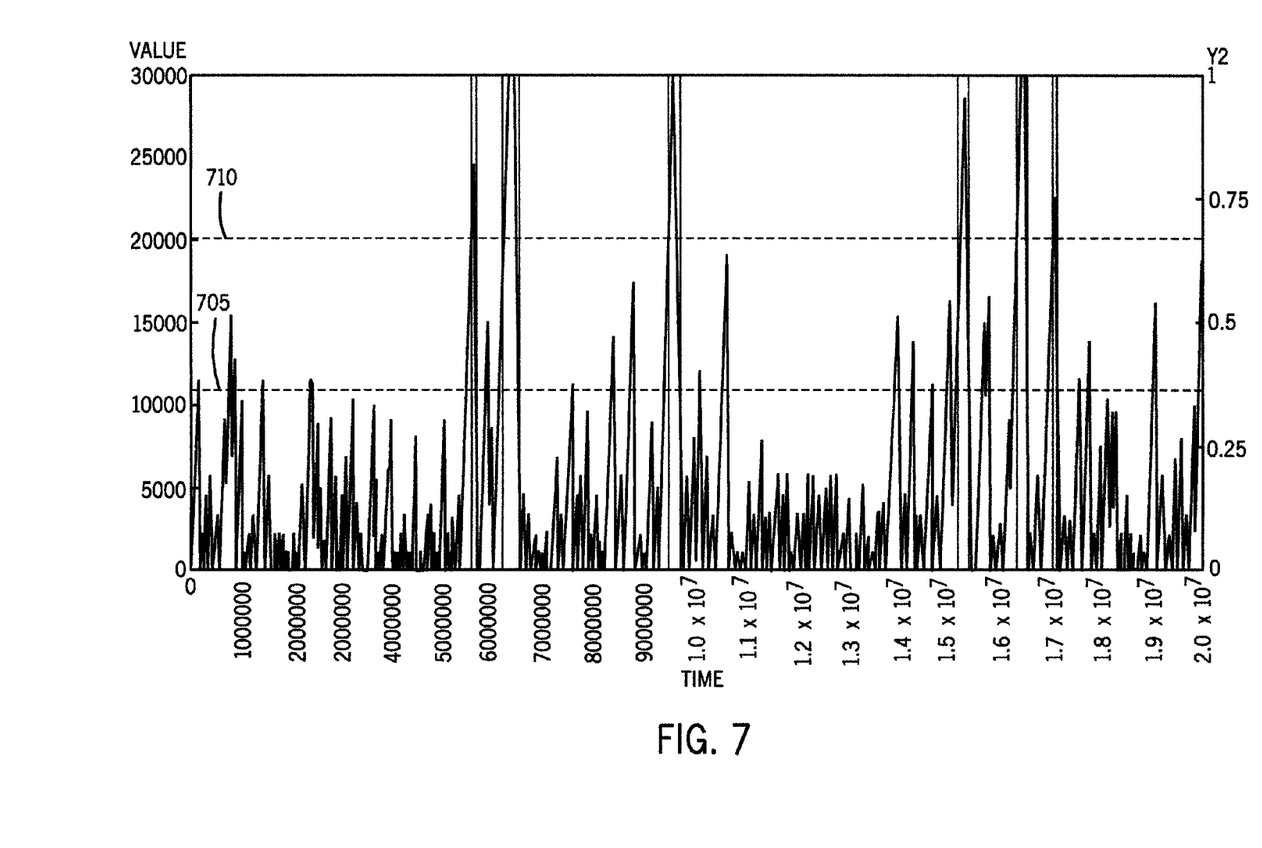
FIG. 7 is a simulation result of turbo mode control in accordance with an embodiment of the present invention.

Referring now to FIG. 7, shown is a simulation result of turbo mode control in accordance with an embodiment of the present invention. FIG. 7 shows how a representative per-thread C0P0 residency counter (namely the turbo mode counter described herein) reacts to the SPECpower_ssj2008 workload. The X-axis shows time of the application from start to finish. The Y-axis shows the C0P0 residency counter value (e.g., for a representative thread), along with various threshold levels with regard to the counter values. Specifically shown on the Y axis in FIG. 7 is a disable threshold 705 where, if the counter value falls below this threshold while in the turbo mode, the turbo mode is disabled. However, when a counter value is above this threshold, the turbo mode is only active if already initiated. That is, having a counter value exceed the disable threshold does not enable entry into the turbo mode. Instead, a counter value triggers entry into turbo mode when it exceeds a trigger threshold 710, which as seen is at a higher level than the disable threshold. The counter value increases as the application executes instructions, then decreases quickly after execution ceases. The illustration shown is for a non_C0P0/C0P0 weight equal to 8× as discussed above. The workload is at 80% utilization, which should not trigger turbo mode because it is below the 89% target. However, note that there are short durations where the counters exceed the trigger threshold for a duration longer than a delay threshold, which in the embodiments shown may be at 0.4 seconds. By increasing this delay threshold to, e.g., 1 second, short bursts of turbo mode may be eliminated in this example. Maintaining a delay threshold of relatively short duration (e.g., less than approximately 1 second) may provide an improved response time when entering turbo mode. In some embodiments, the turbo mode counters can be configured to be clamped at a predetermined upper limit, e.g., corresponding to a maximum counter value. Per-thread turbo mode counters can also be used in processors having per-core P-states to create a turbo decision with socket-wide feedback and control.

Embodiments thus enable a processor to run more power efficiently while still providing enhanced performance by providing tighter control to tune a desired turbo efficiency point. Thus by using an embodiment of the present invention, turbo mode may be active only at high utilization levels, thus improving power efficiency by only activating turbo when performance is needed.

Embodiments may be implemented in code and may be stored on a non-transitory storage medium having stored thereon instructions which can be used to program a system to perform the instructions. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A processor comprising:
 a plurality of cores each including a plurality of front end units, at least one execution unit and at least one cache memory; and
 a power control unit (PCU) including a first storage to store a plurality of performance state indicators each to indicate whether a corresponding thread has requested a first performance state, a second storage to store a plurality of core power state indicators each to indicate whether the corresponding thread has requested a first core power state and a plurality of turbo mode counters each associated with a thread executing on the processor, wherein the PCU includes circuitry configured to control entry into a turbo mode based at least in part on a comparison of a value of at least one of the plurality of turbo mode counters to a trigger threshold.

2. The processor of claim 1, wherein the PCU further includes circuitry configured to update the turbo mode counter for a first thread to indicate a turbo mode request if the performance state indicator and the core power state indicator for the first thread are both of a first state.

3. The processor of claim 2, wherein the PCU further includes circuitry configured to update the turbo mode counter in a first direction according to a first weight if the performance state indicator and the core power state indicator are both of the first state, and otherwise to update the turbo mode counter in a second direction according to a second weight, the second weight greater than the first weight.

4. The processor of claim 3, wherein the first and second weights are user controllable.

5. The processor of claim 1, wherein the PCU further includes circuitry configured to prevent entry into the turbo mode unless a utilization rate of the processor is at least equal to a first threshold.

6. The processor of claim 1, wherein the PCU further includes circuitry configured to cause at least a portion of the processor to enter into the turbo mode if the value of the at least one turbo mode counter is greater than the trigger threshold.

7. The processor of claim 6, wherein the PCU further includes circuitry configured to thereafter cause at least the portion of the processor to remain in the turbo mode if the value of the at least one turbo mode counter is less than the trigger threshold but greater than a disable threshold.

8. The processor of claim 6, wherein the PCU further includes circuitry configured to delay the portion of the processor from entry into the turbo mode for a delay period.

9. A machine-readable non-transitory medium having stored thereon instructions, which if performed by a machine cause the machine to perform a method comprising:
updating a turbo mode counter for each of a plurality of threads executing on a processor according to a first weighting responsive to a turbo mode request for the corresponding thread and according to a second weighting responsive to a non-turbo mode request for the corresponding thread, the second weighting greater than the first weighting;
determining if a value of at least one of the turbo mode counters exceeds a turbo mode trigger threshold; and
if so, entering into a turbo mode for at least a portion of the processor.

10. The machine-readable non-transitory medium of claim 9, wherein the method further comprises determining if a value of at least one of the turbo mode counters is less than a turbo mode disable threshold, and if so, exiting the turbo mode for at least the portion of the processor.

11. The machine-readable non-transitory medium of claim 9, wherein the method further comprises updating a performance state storage to indicate that a first thread of the plurality of threads has requested the turbo mode.

12. The machine-readable non-transitory medium of claim 11, wherein the method further comprises updating a core power state storage to indicate that the first thread has requested a maximum core power state.

13. The machine-readable non-transitory medium of claim 12, wherein the method further comprises updating the turbo mode counter for the first thread based on a value for the first thread in the performance state storage and the core power state storage.

14. The machine-readable non-transitory medium of claim 9, wherein the first and second weightings prevent the turbo mode from being entered unless a utilization rate of the processor is greater than a first threshold, and the method further comprises delaying entry into the turbo mode after the at least one turbo mode counter value exceeds the turbo mode trigger threshold for a first time period.

15. A system comprising:
a processor including a plurality of domains each having at least one core, each of the plurality of domains to operate at an independent frequency, the processor further including a memory controller, one or more interfaces, and a power control logic to execute instructions stored in a non-transitory storage medium the non-transitory storage medium storing instructions to cause a first domain to enter into a turbo mode based on a comparison between a value of a counter that stores a count of core power and performance combinations and a first threshold, the count based at least in part on information obtained from a first storage to store a plurality of performance state indicators each to indicate whether a corresponding thread has requested a first performance state and a second storage to store a plurality of core power state indicators each to indicate whether the corresponding thread has requested a first core power state; and
a dynamic random access memory (DRAM) coupled to the processor.

16. The system of claim 15, wherein the non-transitory storage medium stores instructions to cause the power control logic to update the counter according to a first weighting responsive to a turbo mode request for the first domain and according to a second weighting responsive to a non-turbo mode request for the first domain, the second weighting greater than the first weighting.

17. The system of claim 16, wherein the non-transitory storage medium stores instructions to cause the power control logic to update the counter in a first direction responsive to the turbo mode request and in a second direction responsive to the non-turbo mode request.

18. The system of claim 16, wherein the first and second weightings set a threshold utilization rate of the processor below which the power control logic is to prevent entry into the turbo mode.

19. The system of claim 16, wherein the non-transitory storage medium stores instructions to cause the power control logic to delay entry into the turbo mode after the counter value exceeds the first threshold for a first time period.

* * * * *